（12）United States Patent
Zhang et al.

(10) Patent No.: US 12,505,548 B1
(45) Date of Patent: Dec. 23, 2025

(54) UNSUPERVISED MR-CT SYNTHESIS METHOD, DEVICE, EQUIPMENT, AND STORAGE MEDIUM

(71) Applicant: CANCER HOSPITAL, CHINESE ACADEMY OF MEDICAL SCIENCES, Beijing (CN)

(72) Inventors: Li Zhang, Beijing (CN); Tao Zhou, Nanjing (CN); Meng Tang, Nanjing (CN); Jiuming Jiang, Beijing (CN); Xue Zhang, Beijing (CN); Meng Li, Beijing (CN); Bin Qiu, Beijing (CN)

(73) Assignee: CANCER HOSPITAL, CHINESE ACADEMY OF MEDICAL SCIENCES, Beijing (CN)

( * ) Notice: Subject to any disclaimer, the term of this patent is extended or adjusted under 35 U.S.C. 154(b) by 33 days.

(21) Appl. No.: 19/036,660

(22) Filed: Jan. 24, 2025

(51) Int. Cl.
*G06T 7/00* (2017.01)

(52) U.S. Cl.
CPC .. *G06T 7/0012* (2013.01); *G06T 2207/10081* (2013.01); *G06T 2207/10088* (2013.01)

(58) Field of Classification Search
CPC . G06T 2207/20081; G06T 2207/10081; G06T 2207/10088; G06T 2207/20084; G06T 7/0012; G06T 11/008; G06T 5/50; G06T 5/60; G06T 2207/10072; G06T 2207/30004; G06T 7/33; G06T 11/00; G06T 2211/441; G06T 2210/41; G06T 7/174; G06T 11/003; G06T 2207/20212; G06T 9/002; G06N 3/045; G06N 3/08; G06N 20/00; G06N 3/0464; G06N 3/0475; G16H 30/40; G16H 50/20; G16H 10/60; A61B 6/032; A61B 5/0035; A61B 6/5211; A61B 6/03; A61B 6/5229; A61B 6/5247; A61B 6/5217; A61B 8/5261; G06V 10/82

See application file for complete search history.

(56) References Cited

U.S. PATENT DOCUMENTS

2020/0311913 A1* 10/2020 Soni ............ G06N 3/047
2021/0383538 A1* 12/2021 Deasy ............ G06T 3/4053

OTHER PUBLICATIONS

Zhou, Meihua, et al. "DAMNet: Dynamic mobile architectures for Alzheimer's disease." Computers in Biology and Medicine 185 (2025): 109517 (Year: 2025).*
Y. Guo and H. Hao, "Unsupervised Learning-Based Cross-Modal Transformation of Brain MR-CT Image," 2023 4th International Seminar on Artificial Intelligence, Networking and Information Technology (AINIT), Nanjing, China, 2023, pp. 127-131, doi: 10.1109/AINIT59027.2023.10212625. (Year: 2023).*

* cited by examiner

*Primary Examiner* — Courtney Joan Nelson
(74) *Attorney, Agent, or Firm* — Hemisphere Law, PLLC; Zhigang Ma

(57) ABSTRACT

This invention provides an unsupervised MR-CT synthesis method, apparatus, device, and storage medium, relating to the field of medical image processing technology. It constructs a DMFI-Net framework with two generators and two discriminators. The generators convert between MR and CT images and generate downsampled reconstructed images. GCKS modules and Scale Enhancement modules are added to the generators. This application fully leverages multi-scale feature integration and large receptive field features, significantly enhancing the performance of medical image synthesis.

9 Claims, 2 Drawing Sheets

UNSUPERVISED MR-CT SYNTHESIS METHOD, DEVICE, EQUIPMENT, AND STORAGE MEDIUM

BACKGROUND OF THE INVENTION

1. Field of the Invention

The invention relates to the field of medical image processing technology, particularly concerning an unsupervised MR-CT synthesis method, device, equipment, and storage medium.

2. Description of Related Art

In recent years, multimodal medical imaging has become increasingly important in the diagnosis and treatment of diseases, especially Magnetic Resonance Imaging (MRI) and Computed Tomography (CT), which provide complementary information that significantly enhances diagnostic accuracy and treatment efficacy. MRI excels in showing detailed soft tissue structures, while CT offers comprehensive information about bone details and electronic density. However, CT imaging often involves radiation, posing health risks such as an increased incidence of cancer, and it also prolongs medical procedures and increases corresponding costs. To address these issues, researchers are exploring methods to synthesize CT data from MRI, aiming to comprehensively assess patients' health status while reducing health risks and economic burdens.

Existing research based on Convolutional Neural Networks (CNNs) and Transformers has achieved certain results in this field, but each has its own advantages and disadvantages. CNN methods are effective in local feature extraction and multi-scale information integration; however, due to the limitation of the receptive field, they struggle to capture long-range dependent feature information in images. In contrast, Transformers possess strong global modeling capabilities and can effectively model long-range dependent features, but they have deficiencies in capturing detailed features and multi-scale information, and they come with a quadratic time cost.

SUMMARY OF THE INVENTION

Accordingly, technical problems expected to be solved by the invention are that conventional paired learning methods require a large amount of paired data, posing difficulties for practical applications, and the receptive field of conventional methods is limited, while a large receptive field can lead to issues of time consumption.

In order to solve the above technical problems, the invention provides an unsupervised MR-CT synthesis method, which includes: Constructing a Dynamic Multi-scale Feature Integration Network for Unsupervised MR-CT Synthesis (DMFI-Net) framework; wherein the DMFI-Net framework comprises a first generator, a second generator, a first discriminator, and a second discriminator. The first generator is used to convert an MR image into a CT image and generate a downsampled reconstructed MR image. The first generator is connected to the first discriminator, which is used to distinguish between the CT image generated by the first generator and a real CT image. The second generator is used to convert a CT image into an MR image and generate a downsampled reconstructed CT image. The second generator is connected to the second discriminator, which is used to distinguish between the MR image generated by the second generator and a real MR image. Adding a Global Context-enhanced Kernel Selection Module (GCKS) and a Scale Enhancement Module (SEM) at the ends of the first generator and the second generator; wherein the GCKS module captures richer multi-scale information by adaptively adjusting the receptive field of the convolution, effectively combining local and global features. The scale enhancement module is used to enhance the effective fusion of low-level features during the image translation process, so that the generated image retains finer spatial details.

In an embodiment, the first generator includes a multi-scale branch, a translation branch, and a reconstruction branch; wherein the multi-scale branch, in response to an input downsampled MR image, extracts features from the downsampled MR image to obtain first features. The translation branch, in response to an input MR image, extracts features from the MR image to obtain second features. The reconstruction branch, in response to an input downsampled MR mask image, extracts features from the downsampled MR mask image to obtain third features. The translation branch and the reconstruction branch share parameters. A GCKS module and a convolution module are sequentially connected at the end of the reconstruction branch, and the third features are processed through the GCKS module and the convolution module to obtain a downsampled reconstructed MR image. A GCKS module and two scale enhancement modules are connected at the end of the translation branch, and the second features are processed through one GCKS module and two scale enhancement modules to obtain a CT image. Two scale enhancement modules located after the GCKS module are connected at the middle and/or end of the multi-scale branch.

In an embodiment, the GCKS module comprises: A deep convolution unit, which is used to perform multi-scale convolutions with gradually increasing dilation rates on input features to generate multiple features with different receptive fields. A global context enhancement unit, which is used to obtain global features by applying global context enhancement to the input features, and to enhance the multiple features with different receptive fields using these global features, thereby obtaining enhanced features at different scales. A feature interaction unit, which is used to introduce a feature interaction mechanism among features at each scale based on the enhanced features at different scales, and to weight the features at different scales through adaptive weights, thereby enhancing the response in key regions and improving the detail quality of the image translation.

In an embodiment, the scale enhancement module includes: A fusion unit, which takes the input multi-scale branch low-level features and transformation branch low-level features as input. It upsamples the multi-scale branch low-level features through a transpose convolution operation, concatenates the upsampled multi-scale branch low-level features with the transformation branch low-level features along the channel dimension, and finally enhances the feature fusion through a unit convolution operation to obtain fused features. An attention enhancement unit, which upsamples the decoding branch features to obtain fourth features. It generates an attention map through a spatial selection mechanism and applies it to weight the fused features, thereby obtaining attention-enhanced features. A residual enhancement unit, which performs element-wise addition between the attention-enhanced features and the fourth features to obtain the final output features.

The fusion unit process can be expressed as follows:

$$F_{fuse}=Conv_{1\times1}(Concat(TConv_{3\times3}(F_{ms}),F_{tr})).$$

In the formula, $F_{fuse}$ represents the fused features, $Conv_{1\times1}$ denotes a 1×1 convolutional unit, $F_{ms}$ denotes the low-level features from the multi-scale branch, $F_{tr}$ indicates the low-level features from the transformation branch, $TConv_{3\times3}$ represents a 3×3 transposed convolutional operation, and Concat stands for concatenation operation.

The attention enhancement unit process can be expressed as follows:

$$F_a=RELU(Conv_{3\times3}(F_{de}^{up})+Conv_{3\times3}(F_{fuse})),$$

$$F_{out}^{en}=F_{de}^{up}\times Sigmoid(Conv_{1\times1}(F_a)).$$

In the formula, $F_a$ represents the preliminary fusion result of the fourth feature and the fused features from the previous step, $F_{de}^{up}$ denotes the fourth feature, $Conv_{3\times3}$ denotes a 3×3 convolutional operation, $F_{fuse}$ indicates the fused features, $F_{out}^{en}$ represents the attention-enhanced features, RELU stands for the Rectified Linear Unit (a linear activation function), and Sigmoid denotes the Sigmoid function.

In an embodiment, the present invention provides an unsupervised MR-CT synthesis device, which includes a processor configured to: Construct a DMFI-Net framework. The DMFI-Net framework comprises a first generator, a second generator, a first discriminator, and a second discriminator. The first generator is used to convert MR images into CT images and generate downsampled reconstructed MR images. The first generator is connected to the first discriminator, which is used to distinguish between CT images generated by the first generator and real CT images. The second generator is used to convert CT images into MR images and generate downsampled reconstructed CT images. The second generator is connected to the second discriminator, which is used to distinguish between MR images generated by the second generator and real MR images. Add a GCKS module and a scale enhancement module at the ends of the first generator and the second generator. The GCKS module captures richer multi-scale information by adaptively adjusting the receptive field of convolution, effectively combining local and global features. The scale enhancement module is used to enhance the effective fusion of low-level features during the image translation process, so that the generated images retain finer spatial details.

In an embodiment, the invention provides an electronic device, which includes: at least one processor and a memory; the memory stores computer executable instructions; the at least one processor executes the computer executable instructions stored in the memory, causing the at least one processor to execute the unsupervised MR-CT synthesis method as described in the first aspect and its various possible designs.

The invention provides a computer-readable storage medium, which stores computer executable instructions. When a processor executes the computer executable instructions, the unsupervised MR-CT synthesis method as described in the first aspect and its various possible designs is implemented.

The invention provides a computer program product that includes computer programs. When the computer programs are executed by a processor, the unsupervised MR-CT synthesis method as described in the first aspect and its various possible designs is implemented.

Efficacy can be achieved by the invention is as follows: this method can be utilized for unsupervised MR-CT synthesis, fully leveraging multi-scale features to integrate large receptive field features, significantly enhancing the performance of medical image synthesis. The GCKS module is proposed to extract features with different receptive fields, enhance various structures, and further optimize using global information. To our knowledge, this is the first time that large convolutional kernels have been applied to obtain large receptive field features in unsupervised MR-CT translation tasks. The SEM is proposed to effectively integrate features extracted at multiple scales. This integration is crucial for the comprehensive fusion of spatial information across different resolutions, ensuring a more comprehensive feature representation. Through the use of these modules, the quality of medical image generation is significantly improved.

BRIEF DESCRIPTION OF THE DRAWINGS

In order to more clearly illustrate technical solutions of embodiments of the invention or the prior art, drawings will be used in the description of embodiments or the prior art will be given a brief description below. Apparently, the drawings in the following description only are some of embodiments of the invention, the ordinary skill in the art can obtain other drawings according to these illustrated drawings without creative effort.

DETAILED DESCRIPTION OF THE PREFERRED EMBODIMENTS

In the following, exemplary embodiments will be described in detail, with examples being represented in the accompanying drawings. Unless otherwise indicated, the same numerals in different drawings represent the same or similar elements. The implementations described in the following exemplary embodiments do not represent all implementations consistent with the present application. Rather, they are merely examples of devices and methods that are consistent with some aspects of the present application, as detailed in the appended claims. In the technical solutions of the present application, the collection, storage, use, processing, transmission, provision, disclosure, and other handling of financial data, user data, and other information comply with relevant laws and regulations and do not violate public order and good morals. It should be noted that in the embodiments of the present application, certain software, components, models, and other existing industry solutions may be mentioned. They should be considered exemplary, and their purpose is merely to illustrate the feasibility of implementing the technical solutions of the present application. However, this does not imply that the applicant has already used or will inevitably use such solutions. The following provides a detailed description of the technical solutions of the present application and how they address the aforementioned technical problems through specific embodiments. These specific embodiments can be combined with each other, and concepts or processes that are the same or similar may not be repeated in some embodiments. Below, the embodiments of the present application will be described in conjunction with the accompanying drawings.

Figure 1:
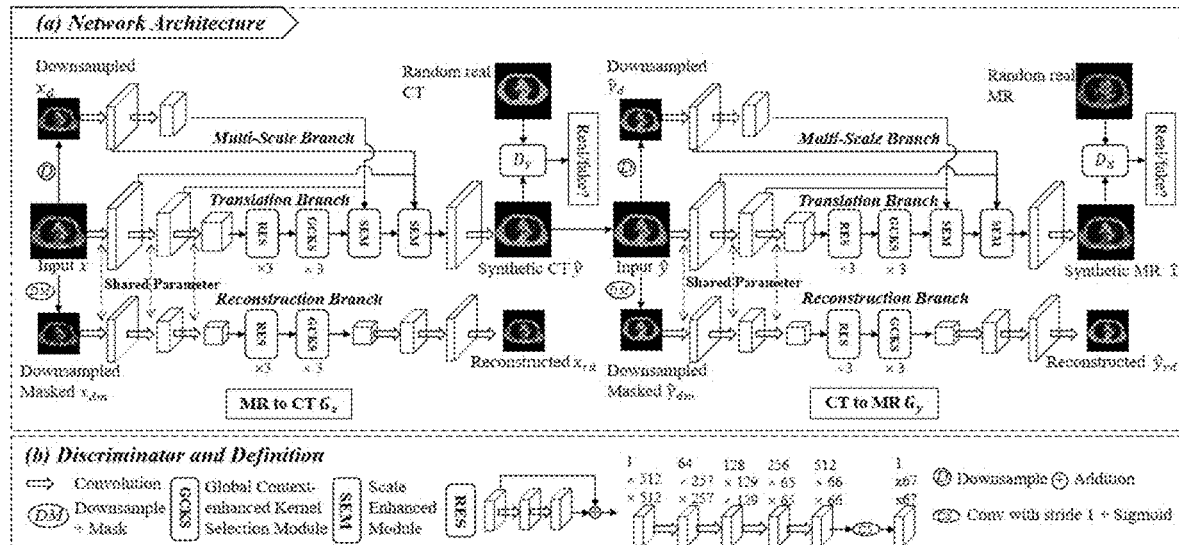
FIG. 1 is an overall network structure diagram of the DMFI-Net framework provided in an embodiment of the present invention, where: (a) shows the overall network flowchart and the detailed structure of the generator; (b) illustrates the detailed structure of the discriminator as well as various operational definitions.

FIG. 1 is an overall network structure diagram of a DMFI-Net framework. As shown in FIG. 1, it depicts the overall network structure of the DMFI-Net framework provided in an embodiment of the present application. The DMFI-Net framework comprises a first generator $G_x$, a second generator $G_y$, a first discriminator $D_y$, and a second discriminator $D_x$. The first generator $G_x$ is used to convert MR images into CT images and generate downsampled reconstructed MR images. The first generator $G_x$ is connected to the first discriminator $D_y$, which is used to distinguish between the CT images generated by the first generator $G_x$ and real CT images. The second generator $G_y$ is used to convert CT images into MR images and generate downsampled reconstructed CT images. The second generator $G_y$ is connected to the second discriminator $D_x$, which is used to distinguish between the MR images generated by the second generator and real MR images. At the ends of the first and second generators, GCKS and SEM modules are added. Among them, the GCKS module captures richer multi-scale information by adaptively adjusting the receptive field of the convolution, effectively combining local and global features. The SEM is used to enhance the effective fusion of low-level features during the image translation process, so that the generated images retain finer spatial details.

In this embodiment, the DMFI-Net framework is equipped with two generators, namely the first generator and the second generator. The functional structures of the first and second generators are basically similar, with the difference being that the first generator is used to convert MR images into CT images, while the second generator is used to convert CT images into MR images. Both the first and second generators serve two functions: image translation and generating downsampled reconstructed images. The first and second discriminators are used to distinguish between the images generated by the first and second generators and real images. It should be noted that the second generator shown in FIG. 1 taking the output of the first generator as input is merely an example and does not constitute a limitation of the present application. In other embodiments, the input of the second generator may not be the output of the first generator. In another embodiment, please refer to FIG. 1. The first generator includes a multi-scale branch, a translation branch, and a reconstruction branch. Among them, the multi-scale branch responds to the input downsampled MR image, performs feature extraction on the downsampled MR image to obtain a first feature. The translation branch responds to the input MR image, performs feature extraction on the MR image to obtain a second feature. The reconstruction branch responds to the input downsampled MR mask image, performs feature extraction on the downsampled MR mask image to obtain a third feature. The translation branch and the reconstruction branch share parameters. A GCKS module and a convolution module are sequentially connected at the end of the reconstruction branch. The third feature is processed through the GCKS module and the convolution module to obtain a downsampled reconstructed MR image. A GCKS module and two SEMs are connected at the end of the translation branch. The second feature is processed through one GCKS module and two SEMs to obtain a CT image. Two SEMs are connected at the middle and/or end of the multi-scale branch after the GCKS module. In this embodiment, as shown in FIG. 1, RES represents residual connections, aimed at further extracting local features. Each branch performs feature extraction on the input image through convolution operations to obtain corresponding features (i.e., the first feature, the second feature, and the third feature). X represents the MR image, $X_{dm}$ represents the downsampled MR mask image obtained by performing DM processing (downsampling+mask processing) on the MR image X. $X_d$ represents the downsampled MR image obtained by performing D processing (downsampling processing) on the MR image X. The GCKS module is a globally context-enhanced kernel selection module used to obtain feature maps with different receptive fields and integrate them into a comprehensive representation. During the decoding process, the SEM module is used to fuse encoder features from the multi-scale branch, features from the translation branch, and features from the decoder, ultimately generating the converted image. It should be noted that the functional structure of the second generator is the same as that of the first generator, with identical module structures and operating principles for each module. Therefore, a detailed explanation of the principles of the second generator is not provided here.

Figure 2:
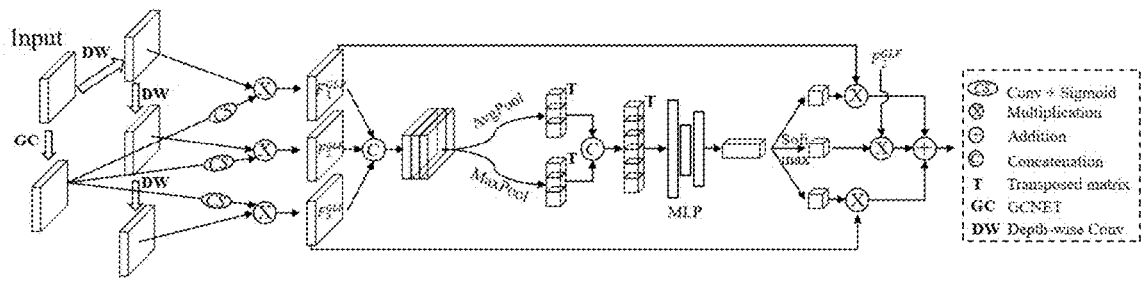
FIG. 2 is a detailed structure diagram of the GCKS module within the DMFI-Net framework provided in an embodiment of the present invention.

FIG. 2 is a detailed structure diagram of the GCKS module within the DMFI-Net framework provided in an embodiment of the present application. As shown in FIG. 2, the core of the GCKS module lies in adaptively adjusting the receptive field of convolution, capturing multi-scale information, and combining local and global features through multi-scale convolution, global context enhancement, and feature interaction mechanisms. Firstly, feature maps of different scales are generated by gradually increasing the dilation rate. Then, global information is utilized to enhance feature representation. Finally, a feature interaction mechanism is employed to optimize the relationship between features of different scales. Specifically, the GCKS module includes a deep convolution unit, a global context enhancement unit, and a feature interaction unit. The deep convolution unit is used to perform multi-scale convolution on the input features by gradually increasing the dilation rate, generating multiple features with different receptive fields. The global context enhancement unit is used to obtain global features by enhancing the input features with global context and to enhance the multiple features with different receptive fields using these global features, obtaining enhanced features of different scales. The feature interaction unit is used to introduce a feature interaction mechanism between features of each scale based on the enhanced features of different scales, and to weight the features of different scales through adaptive weights, thereby enhancing the response of key regions and improving the detail quality of image translation.

In an exemplary embodiment, the data processing workflow of the GCKS module is implemented through the following steps S201 to S203.

S201. Depth-wise Convolutions: For the input feature X, multi-scale convolutions are performed with gradually increasing dilation rates to generate features with different receptive fields. The calculation process is represented as:

$$F_1 = \text{DWConv}_{3\times3}^{1}(X), F_i = \text{DWConv}_{3\times3}^{2i-1}(F_{i-1}), i=2,3.$$

In this formula, $F_1$ represents the first receptive field feature, $\text{DWConv}_{3\times3}$ signifies a depthwise convolution with a kernel size of 3×3 and a dilation rate of 1, and F; indicates the i-th receptive field feature. $\text{DWConv}_{3\times3}$ signifies a depthwise convolution with a kernel size of 3×3 and a dilation rate of (2*i−1), and $F_{i-1}$ indicates the (i−1)-th receptive field feature. By stacking these features layer by layer, context information of different scales can be captured. Moreover, depthwise convolutions can effectively reduce model parameters compared to standard convolutions.

S202. Global Context Enhancement: The input feature X is passed through a GCNET to obtain global features $F_g$, which are then used to adaptively enhance the features with different receptive fields obtained in the first step. The calculation process is represented as:

$$F_i^{GLF} = \text{Sigmoid}(\text{Conv}_{3\times3}(F_g)) \times F_i, i=1,2,3.$$

In this formula, $F_i^{GLF}$ represents the enhanced i-th receptive field feature, and $F_g$ denotes the global feature. Global features are used to enhance the correlation between multi-scale features, obtaining richer feature representations.

S203. Feature Interaction: A feature interaction mechanism is introduced between features of each scale. Adaptive weights are applied to weight the features of different scales, thereby enhancing the response of critical regions and improving the detail quality of MR-CT translation.

Figure 3:
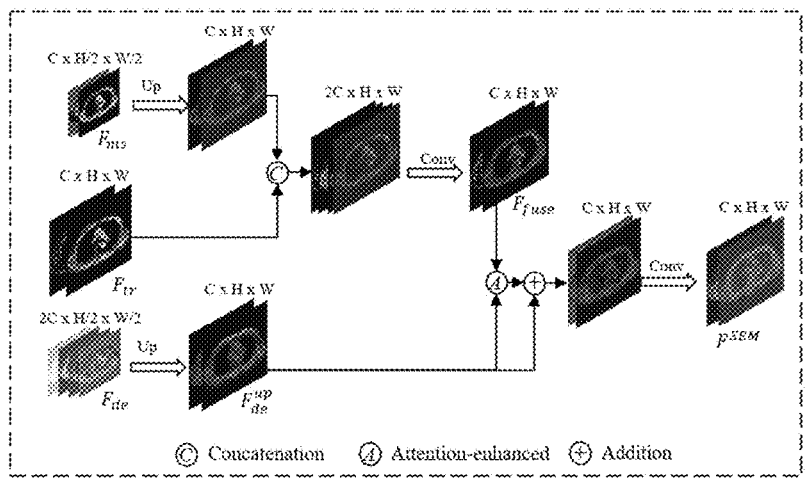
FIG. 3 is a detailed structure diagram of the SEM within the DMFI-Net framework provided in an embodiment of the present application.

FIG. 3 is a detailed structure diagram of the SEM within the DMFI-Net framework provided in an embodiment of the present application, as shown in FIG. 3, the SEM enhances the retention of low-level features during the MR-CT translation process through a multi-scale feature integration strategy, thereby preserving finer spatial details in the generated CT images. The SEM is applied within the decoder network. Firstly, a "TransposeConv" operation is used to upsample the low-level features so that their spatial dimensions align with the high-level features. Then, the low-level features from the multi-scale branch and the high-level features from the translation branch are fused, and the information from different channels is integrated through a 1×1 convolution operation to ensure sufficient information fusion. Specifically, the SEM includes a fusion unit, an attention enhancement unit, and a residual enhancement unit. The fusion unit, based on the input low-level features from the multi-scale branch and the translation branch, upsamples the low-level features from the multi-scale branch using a transpose convolution operation. It then concatenates the upsampled low-level features from the multi-scale branch with the low-level features from the translation branch along the channel dimension. Finally, it enhances feature fusion through a unit convolution operation to obtain fused features. The attention enhancement unit upsamples the features from the decoder branch to obtain fourth features, generates an attention map through a spatial selection mechanism, and weights the fused features to obtain attention-enhanced features. The residual enhancement unit performs element-wise addition of the attention-enhanced features and the fourth features to obtain the final output features. In this embodiment, as shown in FIG. 1, there are two SEMs, each connected sequentially after the GCKS modules connected to the translation branch. For the second SEM, the decoder branch features are the features processed by the first SEM, the low-level features of the multi-scale branch are the features extracted by the first convolution module in the multi-scale branch, and the low-level features of the translation branch are the features extracted by the first convolution module in the translation branch. For the first SEM, the decoder branch features are the second features processed by the GCKS module, the low-level features of the multi-scale branch are the first features, and the low-level features of the translation branch are the features extracted by the second convolution module in the translation branch. In an exemplary embodiment, please refer to FIG. 3 for the data processing flow of the SEM, which is implemented through the following steps S301 to S303. It should be noted that C, H, and W in FIG. 3 represent the number of feature map channels, the height of the feature map, and the width of the feature map, respectively, for the corresponding features.

S301. Integration: For the input low-level features from the multi-scale branch $F_{ms}$, and the translation branch $F_{tr}$. First, the $F_{ms}$ is upsampled through a transpose convolution operation. Then, the two are concatenated along the channel dimension and enhanced through a 1×1 convolution operation for feature fusion. The calculation process is represented as:

$$F_{fuse} = \text{Conv}_{1\times1}(\text{Concat}(\text{TConv}_{3\times3}(F_{ms}), F_{tr})).$$

In this formula, $F_{fuse}$ denotes the fused features, $\text{Conv}_{1\times1}$ denotes a 1×1 convolution, $F_{ms}$ represents the low-level features from the multi-scale branch, $F_{tr}$ indicates the low-level features from the translation branch, $\text{TConv}_{3\times3}$ denotes a transpose convolution operation, and Concat denotes concatenation.

S302. Attention Enhancement: The attention mechanism is utilized to further enhance the feature fusion effect. First, the features $F_{de}$ from the decoding branch are upsampled to obtain the fourth feature $F_{de}^{up}$. Then, an attention map is generated through a spatial selection mechanism to weight the fused features $F_{fuse}$, ensuring that the details of the key regions are prominently represented. The calculation process for S302 is represented as:

$$F_a = \text{RELU}(\text{Conv}_{3\times3}(F_{de}^{up}) + \text{Conv}_{3\times3}(F_{fuse})),$$

$$F_{out}^{en} = F_{de}^{up} \times \text{Sigmoid}(\text{Conv}_{1\times1}(F_a)).$$

In this formula, $F_a$ represents the preliminary fusion result of the fourth feature and the previously fused features, $F_{de}^{up}$ denotes the fourth feature, $\text{Conv}_{3\times3}$ signifies a 3×3 convolution operation, $F_{fuse}$ indicates the fused features, $F_{out}^{en}$ represents the attention-enhanced features, RELU signifies the Rectified Linear Unit (a linear activation function), and Sigmoid denotes the Sigmoid function.

S303. Residual Enhancement: To further preserve decoding information during the fusion process, residual connections are introduced. The fused features are element-wise added to the original decoding branch features to obtain the final output features. The calculation process is represented as:

$$F^{SEM} = \text{Conv}_{3\times3}(F_{out}^{en} + F_{de}^{up}).$$

In this formula, $F^{SEM}$ denotes the final output features.

Figure 4:
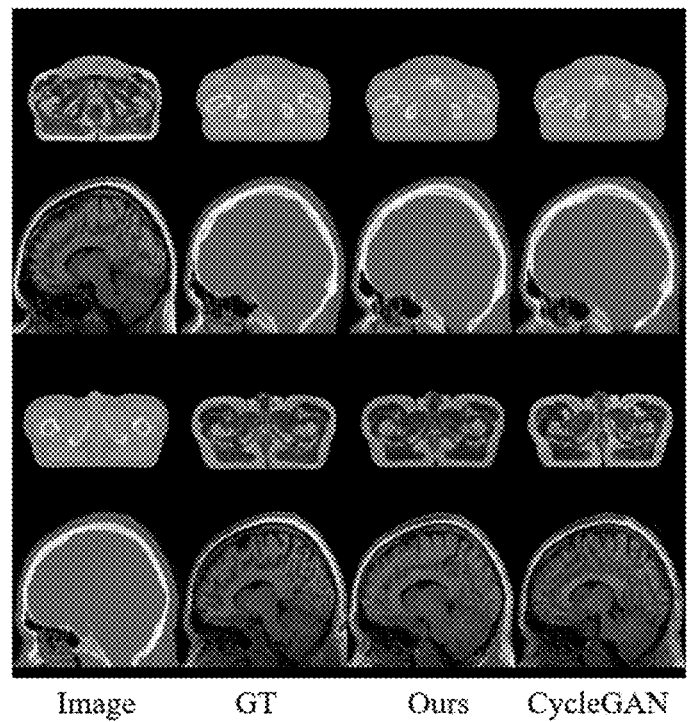
FIG. 4 is a visual comparison diagram provided in an embodiment of the present application, showing the prediction results of the present application in comparison with those of other existing models.

FIG. 4 is a visual comparison diagram provided in an embodiment of the present application, showing the prediction results of the present application in comparison with those of other existing models. It can be observed that the results generated using the framework proposed in this application are more realistic, and they better preserve spatial information as well as handle the generation of organs of different sizes.

Figure 5:
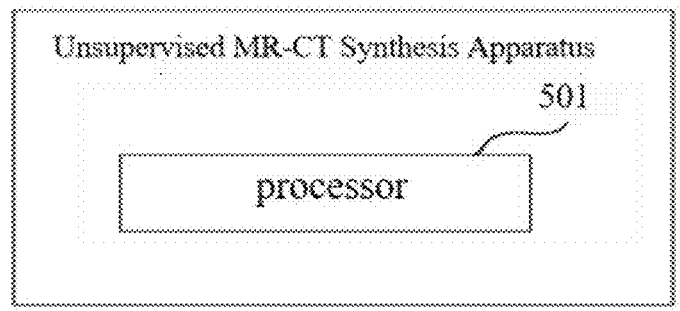
FIG. 5 is a structural schematic diagram of an unsupervised MR-CT synthesis device provided in an embodiment of the present application.

FIG. 5 is a structural schematic diagram of an unsupervised MR-CT synthesis device provided in an embodiment of the present application, as shown in FIG. 5, this unsupervised MR-CT synthesis device includes a processor 501 configured to: Construct a DMFI-Net framework; wherein the DMFI-Net framework comprises a first generator, a second generator, a first discriminator, and a second discriminator. The first generator is used to convert MR images into CT images and generate downsampled reconstructed MR images. The first generator is connected to the first discriminator, which is used to distinguish between CT images generated by the first generator and real CT images. The second generator is used to convert CT images into MR images and generate downsampled reconstructed CT images. The second generator is connected to the second discriminator, which is used to distinguish between MR images generated by the second generator and real MR images.

GCKS modules and scale enhancement modules are added at the ends of the first generator and the second generator; wherein the GCKS module captures richer multiscale information by adaptively adjusting the receptive field of convolution, effectively combining local and global features. The scale enhancement module is used to enhance the effective fusion of low-level features during the image translation process, so that the generated images retain finer spatial details.

An embodiment of this application provides an electronic device. The electronic device may include: a processor and a memory, wherein the processor and the memory can communicate; exemplary, the processor and the memory communicate via a communication bus.

The processor executes computer-executable instructions stored in the memory, causing the processor to execute the scheme in the aforementioned embodiment. The processor may be a general-purpose processor, including a Central Processing Unit (CPU), a Network Processor (NP), etc.; it may also be a Digital Signal Processor (DSP), an Application Specific Integrated Circuit (ASIC), a Field-Programmable Gate Array (FPGA), or other programmable logic devices, discrete gates or transistor logic devices, discrete hardware components.

The communication bus may be a Peripheral Component Interconnect (PCI) bus or an Extended Industry Standard Architecture (EISA) bus, etc. The system bus can be divided into an address bus, a data bus, a control bus, etc. For ease of representation, only a thick line is used in the figures to represent the bus, but this does not mean that there is only one bus or one type of bus. A transceiver is used to enable communication between the database access device and other computers (such as clients, read-write libraries, and read-only libraries). The memory may contain Random Access Memory (RAM) and may also include Non-Volatile Memory (NVM), such as at least one disk memory, and may also be a USB flash drive, a portable hard drive, a read-only memory, a magnetic disk, or an optical disk.

The electronic device provided in an embodiment of this application may be a terminal device in the aforementioned embodiment.

An embodiment of this application further provides a computer-readable storage medium storing computer instructions therein. When the computer instructions are executed on a computer, the computer is caused to execute the technical solution of the unsupervised MR-CT synthesis method in the aforementioned embodiment.

An embodiment of this application further provides a computer program product including computer programs stored in a computer-readable storage medium. At least one processor can read the computer programs from the computer-readable storage medium, and when the at least one processor executes the computer programs, the technical solution of the unsupervised MR-CT synthesis method in the aforementioned embodiment can be implemented.

In several embodiments provided by this application, it should be understood that the disclosed devices and methods can be implemented in other ways. For example, the device embodiment described above is merely illustrative. For example, the division of modules is only a logical functional division, and there may be other division methods during actual implementation. For example, multiple modules can be combined or integrated into another system, or some features may be ignored or not executed. Another point is that the coupling or direct coupling or communication connection displayed or discussed may be an indirect coupling or communication connection through some interfaces, devices, or modules, which may be in electrical, mechanical, or other forms.

Modules described as separate components may or may not be physically separate. Components displayed as modules may or may not be physical units, i.e., they may be located in one place or distributed across multiple network units. Some or all of the modules can be selected to implement the embodiment scheme according to actual needs.

In addition, the functional modules in the respective embodiments of this application can be integrated into one processing unit, can also exist physically separately, or two or more modules can be integrated into one unit. The units in the aforementioned modules can be implemented in hardware form or in the form of a hardware plus software functional unit.

The integrated modules implemented in the form of software functional modules can be stored in a computer-readable storage medium. The aforementioned software functional modules stored in a storage medium include several instructions for causing a computer device (which can be a personal computer, a server, or a network device, etc.) or a processor to execute some steps of the methods in the respective embodiments of this application.

It should be understood that the aforementioned processor may be a Central Processing Unit (CPU), or may be other general-purpose processors, Digital Signal Processors (DSPs), Application Specific Integrated Circuits (ASICs), etc. A general-purpose processor may be a microprocessor or any conventional processor. The steps of the method disclosed in conjunction with the invention can be directly embodied as being executed by a hardware processor, or can be executed by a combination of hardware and software modules in the processor.

The memory may contain high-speed RAM memory and may also include Non-Volatile Memory (NVM), such as at least one disk memory, and may also be a USB flash drive, a portable hard drive, a read-only memory, a magnetic disk, or an optical disk.

The bus may be an Industry Standard Architecture (ISA) bus, a Peripheral Component Interconnect (PCI) bus, or an Extended Industry Standard Architecture (EISA) bus, etc. The bus can be divided into an address bus, a data bus, a control bus, etc. For ease of representation, the bus in the figures of this application is not limited to only one bus or one type of bus.

The aforementioned storage medium can be implemented by any type of volatile or non-volatile storage device or a combination of them, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disks, or optical disks. The storage medium can be any available medium accessible by a general-purpose or dedicated computer.

An exemplary storage medium is coupled to the processor, enabling the processor to read information from the storage medium and write information to the storage medium. Of course, the storage medium can also be a component of the processor. The processor and the storage medium can be located in an Application Specific Integrated Circuit (ASIC). Of course, the processor and the storage medium can also exist as separate components in an electronic control unit or a main control device.

Those of ordinary skill in the art can understand that all or some of the steps of the method embodiments described above can be completed by program instructions related to hardware. The aforementioned program can be stored in a computer-readable storage medium. When the program is executed, it executes the steps of the aforementioned method embodiments; and the aforementioned storage medium includes: ROM, RAM, magnetic disks, or optical disks, and various media that can store program codes.

Finally, it should be noted that: the above embodiments are only used to illustrate the technical solutions of this application, and are not intended to limit them; although this application has been described in detail with reference to the aforementioned embodiments, those of ordinary skill in the art should understand that they can still modify the technical solutions recorded in the aforementioned embodiments, or perform equivalent replacements on some or all of the technical features; and these modifications or replacements do not cause the essence of the corresponding technical solutions to deviate from the scope of the technical solutions of the embodiments of this application.

What is claimed is:

1. An unsupervised magnetic resonance (MR)-computed tomography (CT) synthesis method, characterized by comprising: constructing a dynamic multi-scale feature integration network (DMFI-Net) framework; wherein the DMFI-Net framework includes a first generator, a second generator, a first discriminator, and a second discriminator, the first generator is used to convert an MR image into a CT image and generate a downsampled reconstructed MR image, the first generator is connected to the first discriminator, the first discriminator is used to distinguish between the CT image generated by the first generator and a real CT image, the second generator is used to convert a CT image into an MR image and generate a downsampled reconstructed CT image, the second generator is connected to the second discriminator, and the second discriminator is used to distinguish between the MR image generated by the second generator and a real MR image; adding a global context-enhanced kernel selection GCKS) module and a scale enhancement module at the ends of the first generator and the second generator; wherein the GCKS module captures richer multi-scale information by adaptively adjusting the receptive field of convolution, effectively combining local and global features, and the scale enhancement module is used to enhance the effective fusion of low-level features during the image translation process, so that the generated image retains finer spatial details.

2. The unsupervised MR-CT synthesis method according to claim 1, characterized in that the first generator includes a multi-scale branch, a translation branch, and a reconstruction branch; wherein the multi-scale branch responds to an input downsampled MR image, performs feature extraction on the downsampled MR image to obtain first features, the translation branch responds to an input MR image, performs feature extraction on the MR image to obtain second features, the reconstruction branch responds to an input downsampled MR mask image, performs feature extraction on the downsampled MR mask image to obtain third features, the translation branch and the reconstruction branch share parameters, a GCKS module and a convolution module are sequentially connected at the end of the reconstruction branch, and the third features are processed by the GCKS module and the convolution module to obtain the downsampled reconstructed MR image, another GCKS module and two scale enhancement modules are connected at the end of the translation branch, the second features are processed by the another GCKS module and the two scale enhancement modules to obtain the CT image, and a middle and/or an end of the multi-scale branch is connected to the two scale enhancement modules located after the another GCKS module connected to the translation branch.

3. The unsupervised MR-CT synthesis method according to claim 2, characterized in that the GCKS module includes:
a deep convolution unit, which is used for performing multi-scale convolution with gradually increasing dilation rates on input features to generate multiple features with different receptive fields;
a global context enhancement unit, which is used to obtain global features by enhancing the global context of the input features, and use the global features to enhance the multiple features with different receptive fields to obtain enhanced features of different scales; and
a feature interaction unit, which is used to introduce a feature interaction mechanism among features of each scale based on the enhanced features of different scales, and weight the features of different scales through adaptive weights, thereby enhancing the response of key regions and improving the detail quality of image translation.

4. The unsupervised MR-CT synthesis method according to claim 2, characterized in that the scale enhancement module includes:
a fusion unit, which is based on input low-level features of the multi-scale branch and the translation branch, performs upsampling on the low-level features of the multi-scale branch through a transpose convolution operation, and concatenates the upsampled low-level features of the multi-scale branch with the low-level features of the translation branch through the channel dimension, and finally enhances feature fusion through a unit convolution operation to obtain fused features;
an attention enhancement unit, which is used to upsample decoding branch features to obtain fourth features, generate an attention map through a spatial selection mechanism, and weight the fused features to obtain attention-enhanced features; and
a residual enhancement unit, which is used to perform element-wise addition between the attention-enhanced features and the fourth features to obtain final output features.

5. The unsupervised MR-CT synthesis method according to claim 4 is characterized in that the data processing procedure of the fusion unit is represented as:

$$F_{fuse}=\text{Conv}_{1\times1}(\text{Concat}(\text{TConv}_{3\times3}(F_{ms}),F_{tr}))$$

in the formula, $F_{fuse}$ represents the fused features, $\text{Conv}_{1\times1}$ represents a 1×1 convolutional operation, $F_{ms}$ represents the low-level features from the multi-scale branch, $F_{tr}$ represents the low-level features from the transformation branch, $TConv_{3\times3}$ represents a transposed convolutional operation, and Concat represents a concatenation operation.

6. The unsupervised MR-CT synthesis method according to claim 4 is characterized in that the data processing procedure of the attention enhancement unit is represented as:

$$F_a = RELU(Conv_{3\times3}(F_{de}^{up}) + Conv_{3\times3}(F_{fuse})),$$

$$F_{out}^{en} = F_{de}^{up} \times Sigmoid(Conv_{1\times1}(F_a))$$

in the formula, $F_a$ represents the preliminary fusion result of the fourth features and the previously fused features, $F_{de}^{up}$ represents the fourth features, $Conv_{3\times3}$ represents a 3×3 convolutional operation, $F_{fuse}$ represents the fused features, $F_{out}^{en}$ represents the attention-enhanced features, ReLU represents the Rectified Linear Unit activation function, and Sigmoid represents the Sigmoid function.

7. An electronic device, characterized in that it includes: a processor, and a memory communicatively connected to the processor; the memory stores computer executable instructions; the processor executes the computer executable instructions stored in the memory to implement the unsupervised MR-CT synthesis method as described in claim 1.

8. A non-transitory computer-readable storage medium, characterized in that the non-transitory computer-readable storage medium stores computer executable instructions that, when executed by a processor, are used to implement the unsupervised MR-CT synthesis method as described in claim 1.

9. An unsupervised MR-CT synthesis device, characterized in that the device includes a processor configured to:
construct a DMFI-Net framework; wherein the DMFI-Net framework includes a first generator, a second generator, a first discriminator, and a second discriminator; the first generator is used to convert MR images into CT images and generate downsampled reconstructed MR images; the first generator is connected to the first discriminator, which is used to distinguish between the CT images generated by the first generator and real CT images; the second generator is used to convert CT images into MR images and generate downsampled reconstructed CT images; the second generator is connected to the second discriminator, which is used to distinguish between the MR images generated by the second generator and real MR images; and
add a GCKS module and a scale enhancement module at the ends of the first generator and the second generator; wherein the GCKS module is configured to capture richer multi-scale information by adaptively adjusting the receptive field of convolution, effectively combining local and global features; and the scale enhancement module is used to enhance the effective fusion of low-level features during the image translation process, so that the generated images retain finer spatial details.

\* \* \* \* \*